Patented May 19, 1931

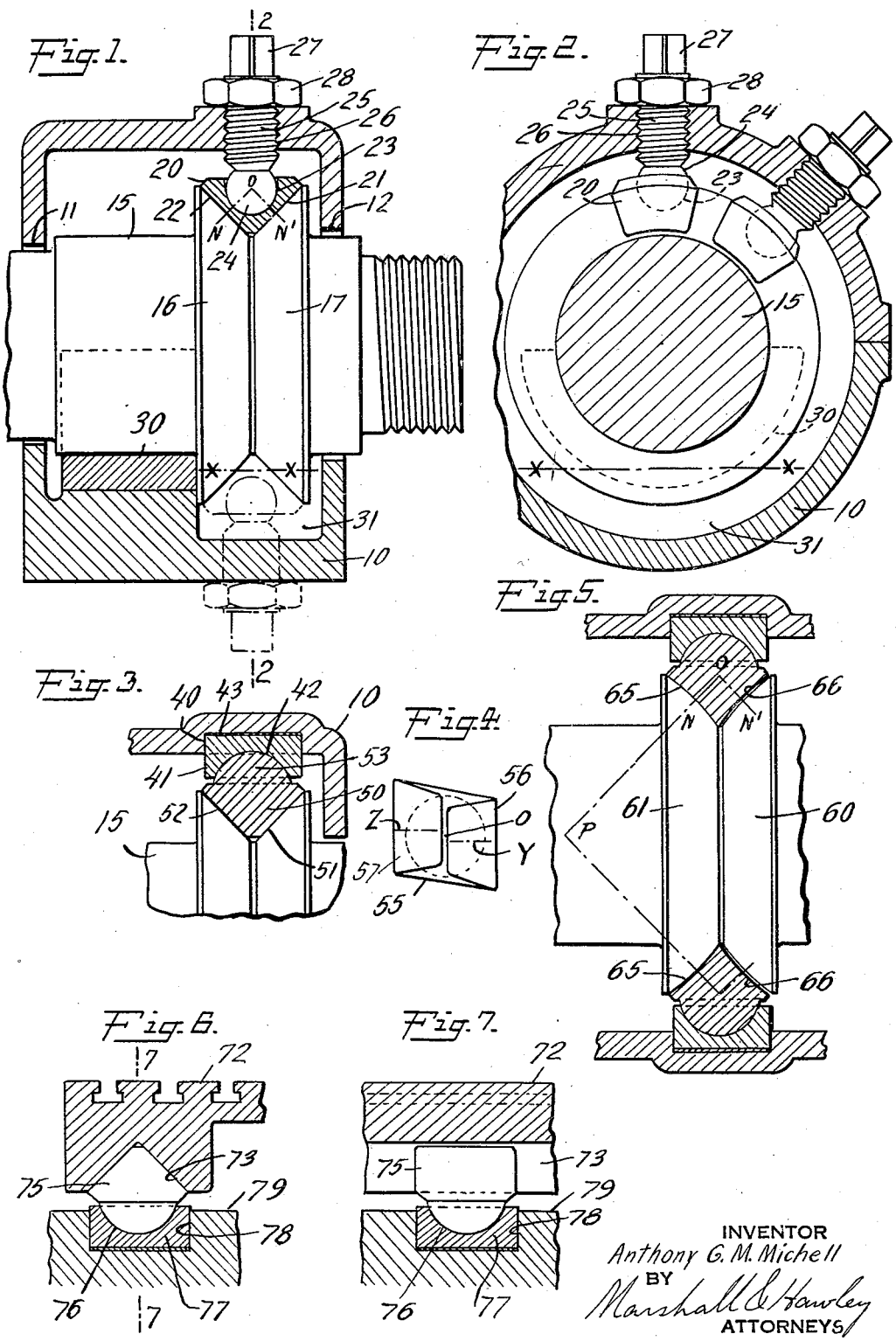

1,805,992

UNITED STATES PATENT OFFICE

ANTHONY G. M. MICHELL, OF MELBOURNE, AUSTRALIA

BEARING

Application filed August 16, 1928. Serial No. 299,941.

This invention relates to bearings.

The invention, more specifically stated, relates to the type of bearing combining the functions of a journal bearing and thrust bearing for rotating shafts. A bearing of this type is disclosed in Michell Patent No. 1,617,719. The bearing in this patent comprises a pair of coacting bearing elements, one element being pivoted in such a manner as to permit a slight tilting movement thereof relative to the other element. This induces the formation of an oil film between the coacting surfaces of the bearing elements. A similar bearing is shown in Michell Patent No. 1,196,573, but the bearing in this patent constitutes a thrust bearing and not a combined thrust and journal bearing.

This invention has for its salient object to provide a bearing of the type specified that is simple and efficient in construction, comprises a minimum number of parts, and can be economically manufactured and assembled.

Another object of the invention is to provide a device of the type specified, so constructed and arranged that it will take up thrusts on the shaft in either direction.

Further objects of the invention will appear from the following specification taken in connection with the drawings, which form a part of this application, and in which Fig. 1 is a longitudinal sectional elevation of a bearing constructed in accordance with the invention;

Fig. 2 is a sectional elevation, partly broken away, taken at right angles to Fig. 1 and substantially on line 2—2 of Fig. 1;

Fig. 3 is a fragmentary sectional view illustrating a slightly modified form of bearing;

Fig. 4 is a plan view of another bearing element constructed in accordance with the invention;

Fig. 5 is a sectional elevation similar to Fig. 1 but showing a slightly different form of construction;

Fig. 6 is a fragmentary sectional elevation showing another application or use of the bearing; and Fig. 7 is a sectional elevation taken at right angles to Fig. 6 substantially on line 7—7 of Fig. 6.

The invention briefly described consists primarily of one or more pivoted bearing elements having relatively inclined surfaces adapted to coact with and be disposed in bearing relation to correspondingly inclined surfaces formed on a shaft or other element.

Further details of the invention will appear from the following description.

In the form of the invention illustrated in Figs. 1 and 2, there is shown a casing 10 having openings 11 and 12 through which extends a shaft 15.

One form of the invention was designed particularly for lathes, the shaft 15 constituting the mandrel of the lathe.

The shaft 15 is upset and provided with an annular groove substantially V-shaped in section and having angularly inclined conical surfaces 16 and 17.

A bearing element 20 has oppositely inclined surfaces 21 and 22 conforming to the surfaces 16 and 17 of the annular groove formed on the shaft. The bearing element 20 has a spherical socket 23 which receives a ball 24 formed on the end of a screw 25 which is threaded into the wall 26 of the casing. The outer end 27 of the screw is square to facilitate the adjustment of the screw in the casing and a lock nut 28 is mounted on the screw for holding the screw in adjusted position.

Attention is called to the fact that the lines ON and ON', drawn from the center of the ball 24 normal to the surfaces 21 and 22, intersect the surfaces 16 and 17 of the wall of the groove substantially midway between the inner and outer peripheral edges thereof.

As illustrated in Fig. 2, the center of the ball is located nearer one end of the bearing face 21 or 22 than the other end thereof according to the known principles of construction of pivoted bearing elements. The bearing element 20 being located in Fig. 1 at the upper side of the shaft or mandrel, is adapted to resist upward thrust or reaction of the lathe tool on the work carried by the mandrel.

A journal bearing brass or bushing 30 of usual construction may be fitted in the casing 10 below the shaft 15 to support the shaft when the lathe tool is not in use.

It will be understood that as many bearing elements may be used as desired and, in Fig. 2, two such elements are illustrated. In Fig. 1 a bearing element is shown in dotted lines at the bottom of the casing. In this way the mandrel can be supported against forces acting in various directions and in case a bearing element is located as shown in dotted lines in Fig. 1, the bushing or brass 30 will be omitted.

The lower portion of the casing 10 is preferably filled with oil to the line X—X, the casing being provided with a recess or pocket 31 within which the oil is located. It will be noted that the upset portion of the shaft having the groove therein dips into the oil, thus lubricating the surfaces 16 and 17 and providing an oil film between these surfaces and the oppositely inclined surfaces 21 and 22 of the element 20.

From the foregoing description it will be clear that the bearing illustrated in Figs. 1 and 2 will function as a thrust bearing resisting thrust on the shaft in either direction and will also function as a journal bearing.

The bearing element illustrated in Fig. 3 is similar to that shown in Figs. 1 and 2, but differs therefrom in that the casing 10 is provided with a recess 40 in which is seated a block 41 having a concave spherical bearing surface 42. In order to provide for adjustment of the block 41, shims 43 may be inserted in the recess 40.

The shaft 15 is provided with an upset portion grooved as shown in Fig. 1 and a bearing element 50 has surfaces 51 and 52 adapted to fit in the groove and has a spherical bearing surface 53 adapted to seat in the concave spherical socket 42 in the block 41.

In this bearing, as in the bearing above described, lines normal to the surfaces 51 and 52 from the center of curvature of the surface 53 intersect the surfaces 51 and 52 midway between the inner and outer peripheries thereof.

The bearing element illustrated in Fig. 4 was designed for use with oppositely rotating contacting surfaces. In other words, the surface contacting with the bearing element surface 55, may rotate in one direction and the surface contacting with the surface 56 may rotate in the opposite direction. The center O of the spherical pivoting surface is located on opposite sides of the lines Y and Z disposed midway between the ends of the surfaces 55 and 56.

The construction illustrated in Fig. 5 is similar to that shown in Fig. 3 but differs therefrom in that the surfaces 60 and 61 are curved or conoidal instead of conical. In this construction, the lines ON and ON' connecting the center of curvature of the spherical surface 53 with the center of curvature P of the curved surfaces 60 and 61, intersect the surfaces 60 and 61 substantially midway between the inner and outer peripheries thereof.

A bearing of the type illustrated in Fig. 5 is particularly adapted for use as a combined thrust and journal bearing when the thrust loads acting in either axial direction predominate over the transverse or journal load. For this application of the bearing a plurality of bearing elements are preferably uniformly located around the axis of the shaft or mandrel and the surfaces 60 and 61 are so curved that their centers are disposed on the axis of the mandrel.

When the thrust acts from left to right, the surface 61 is supported by the faces 65 of the bearing elements, the surface 60 being free from the opposite face 66 of the bearing element.

If the mandrel is free to turn about an axis located at the point P, it will then be self-alining. Figs. 6 and 7 illustrate the application of the bearing to the traveling bed of a planing machine. The bed of the planer is shown at 72 and is provided with a longitudinal V-shaped groove 73 similar in construction to the V-shaped grooves formed on the shafts in the preceding embodiments of the invention.

Bearing elements 75, similar in construction to the bearing element shown in Fig. 3, are mounted in spherical sockets 76 formed in blocks 77 positioned in recesses 78 formed in the frame 79 of the planer. The oppositely inclined bearing surfaces of the bearing element 75 are, in this instance, plane surfaces instead of conical or conoidal. It will be understood that as many bearing elements 75 may be used as desired.

From the foregoing specification it will be clear that a simple and practical bearing construction has been designed and that a bearing constructed as described will efficiently perform the functions for which it was designed.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A combined journal and thrust bearing including in combination, a pair of relatively movable elements, one element having a substantially V-shaped groove, and the other element being pivotally mounted and having bearing surfaces adapted to fit within said groove.

2. A combined journal and thrust bearing including in combination, a pair of relatively movable elements, one element having a substantially V-shaped annular groove, and the other element being pivotally mounted and having bearing surfaces adapted to fit within said groove.

3. A combined journal and thrust bearing including in combination, a pair of relatively movable elements, one element having a substantially V-shaped groove, and the other element being pivotally mounted and having bearing surfaces adapted to fit within said groove, the pivot of one element and the bearing surfaces of the other element being so relatively located and arranged that lines from the pivot normal to the surfaces will intersect said surfaces midway between the side edges thereof.

4. A combined journal and thrust bearing including in combination, a pair of relatively movable elements, one element having a substantially V-shaped groove, the walls of the groove being conical, and the other element being pivotally mounted and having bearing surfaces adapted to fit within said groove.

5. A combined journal and thrust bearing including in combination, a pair of relatively movable bearing elements, one element having an inclined bearing surface and the other element being pivoted and having a bearing surface conforming to and fitting said inclined surface, the pivot of one element and the inclined bearing surface of the other element being so relatively constructed and arranged that a line from the pivot normal to said inclined surface will intersect said surface substantially midway between the side edges thereof.

6. A combined journal and thrust bearing including in combination, a casing, a shaft therein having angularly disposed bearing surfaces, and a bearing element having surfaces coacting with said bearing surfaces on the shaft, said bearing element being pivotally and non-rotatably associated with the casing.

7. A combined journal and thrust bearing including in combination, a casing, a shaft therein having angularly disposed bearing surfaces, and a bearing element having surfaces slidably coacting with said bearing surfaces on the shaft, said bearing element being adjustably carried by said casing.

8. A combined journal and thrust bearing including in combination, a rotatable shaft having a V-shaped groove therein and a plurality of radially disposed bearing elements non-rotatably arranged around the shaft, each element having inclined surfaces adapted to fit within said groove.

9. A combined journal and thrust bearing including in combination, a rotatable shaft having a V-shaped groove therein and a plurality of radially disposed bearing elements arranged around the shaft, each element being pivoted non-rotatable and having inclined surfaces adapted to fit within said groove.

10. A combined journal and thrust bearing including in combination, a rotatable shaft having a V-shaped groove therein and a plurality of radially disposed bearing elements arranged around the shaft, each element being universally pivoted and having inclined surfaces adapted to fit within said groove.

11. A combined journal and thrust bearing including in combination, a pair of relatively movable elements, one element having a substantially V-shaped groove and the other element being universally, pivotally mounted and having bearing surfaces adapted to fit within said groove.

12. A combined journal and thrust bearing including in combination, a rotatable shaft having a V-shaped groove therein and a plurality of radially disposed bearing elements arranged around the shaft adjustable toward and away from the shaft, each element having inclined surfaces adapted to fit within said groove.

13. A combined journal and thrust bearing including in combination, a fixed member and a rotatable member, one member having a substantially V-shaped groove and the other member having pivoted thereto a bearing element having surfaces adapted to fit within and engage the walls of said groove.

14. A combined journal and thrust bearing including in combination, a casing, a shaft rotatably mounted therein and having an annular projection thereon, said projection having oppositely inclined bearing surfaces formed thereon, said casing having a lubricant pocket receiving said annular projection and bearing surfaces, and a bearing element carried by the casing having bearing surfaces inclined to engage the bearing surfaces on said projection.

15. A combined journal and thrust bearing including in combination, a casing, a shaft rotatably mounted therein and having an annular projection thereon, said projection having oppositely inclined bearing surfaces formed thereon, said casing having a lubricant pocket receiving said annular projection and bearing surfaces, and a bearing element pivotally carried by the casing having bearing surfaces inclined to engage the bearing surfaces on said projection.

16. A bearing element having a pair of relatively inclined bearing surfaces and having a spherical bearing surface, the center of curvature of the spherical surface being located at the intersection of lines located midway between the edges of the inclined bearing surfaces and normal thereto.

17. A combined journal and thrust bearing including in combination, a rotatable member having a substantially V-shaped annular groove therein, and a pivoted bearing element having bearing surfaces adapted to fit within said groove, the pivot of said element being located nearer one end of the bearing surfaces than the other end thereof.

In witness whereof, I have hereunto set my hand this 15th day of August, 1928.

ANTHONY G. M. MICHELL.